Figure 1:
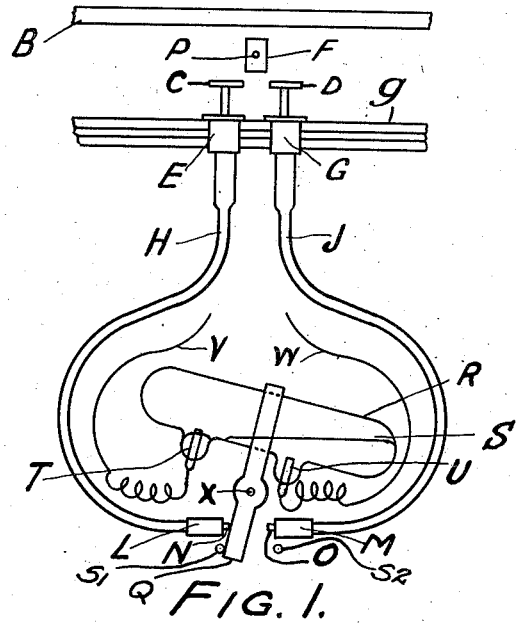

Oct. 4, 1938.  C. A. F. FENNELL  2,131,943
CONTROL DEVICE
Filed Aug. 14, 1935  6 Sheets-Sheet 1

Oct. 4, 1938.   C. A. F. FENNELL   2,131,943
CONTROL DEVICE
Filed Aug. 14, 1935   6 Sheets-Sheet 2

Oct. 4, 1938.  C. A. F. FENNELL  2,131,943
CONTROL DEVICE
Filed Aug. 14, 1935  6 Sheets-Sheet 4
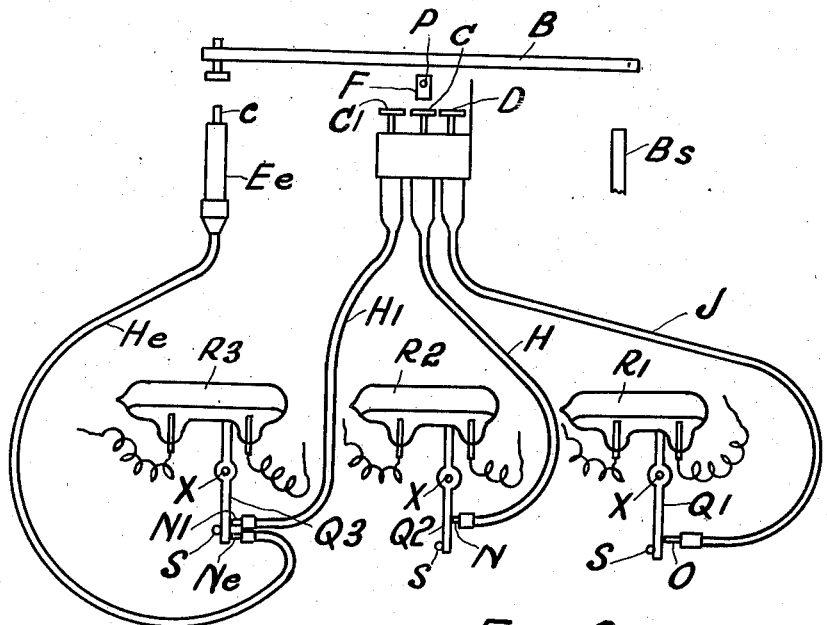
FIG. 8.
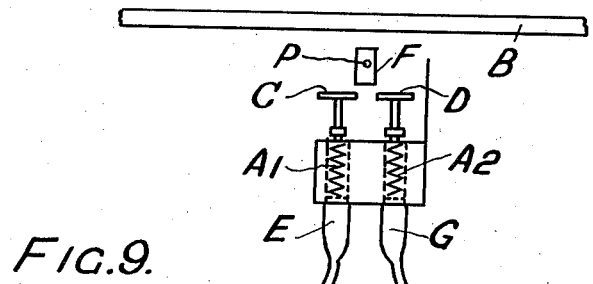
FIG. 9.
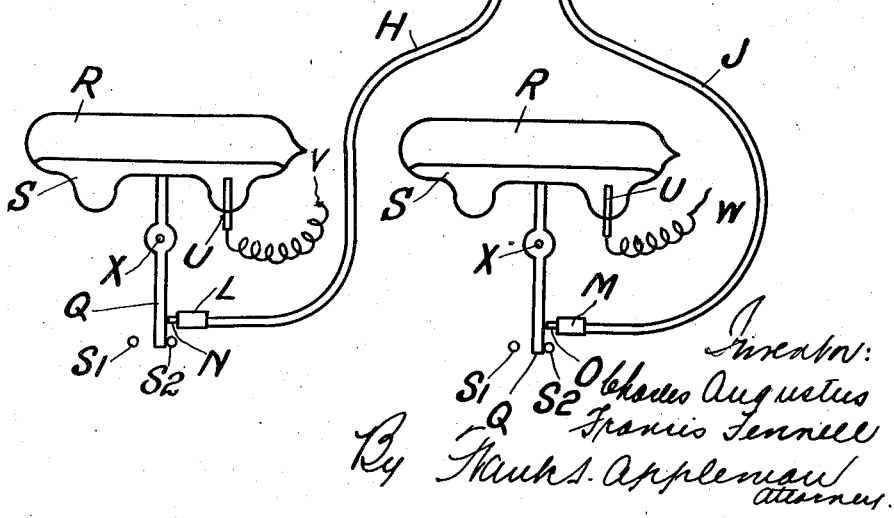

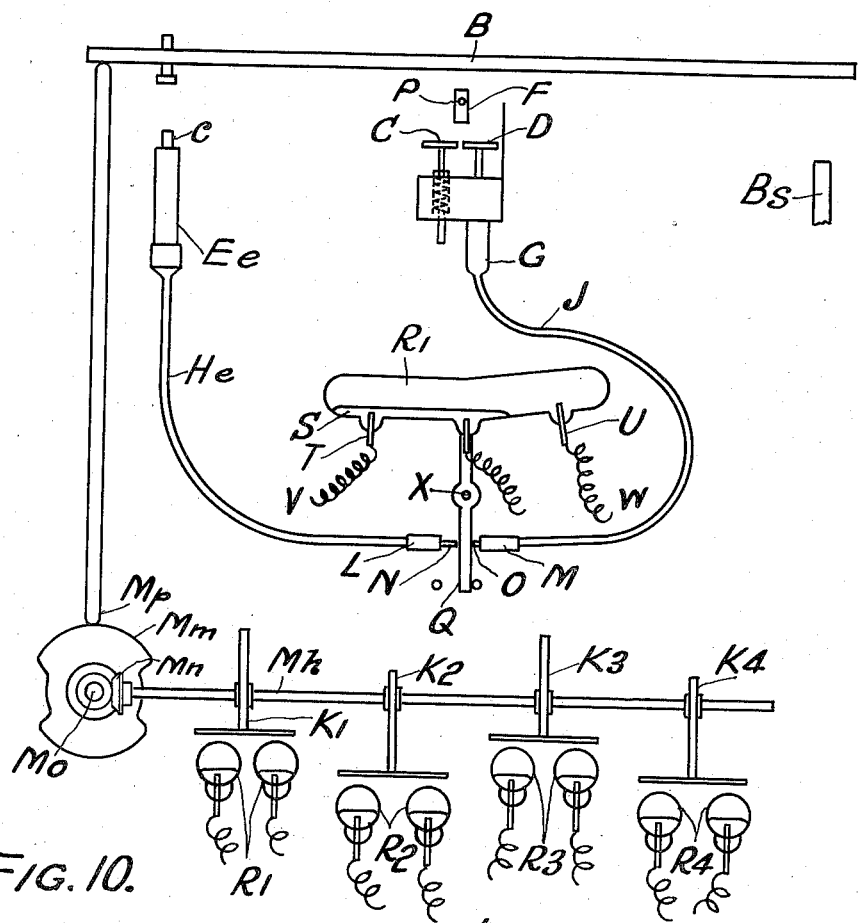
FIG. 10.
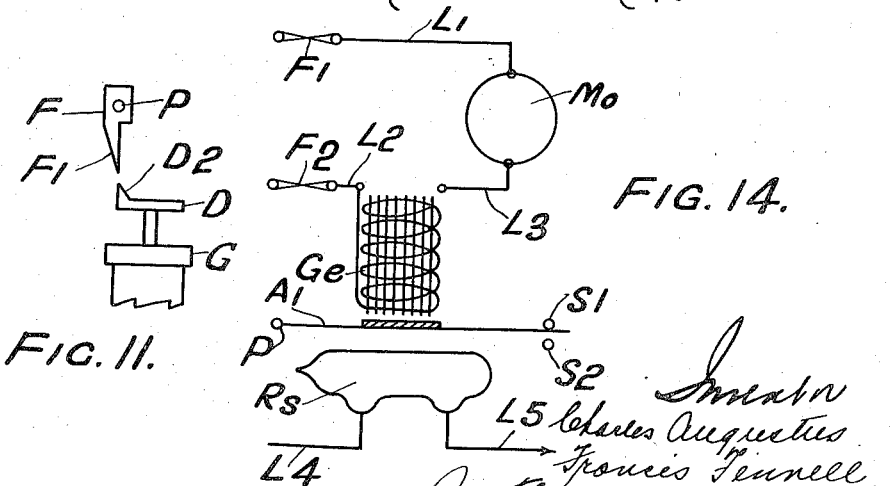
FIG. 11.
FIG. 14.

Oct. 4, 1938.  C. A. F. FENNELL  2,131,943
CONTROL DEVICE
Filed Aug. 14, 1935  6 Sheets-Sheet 6

Patented Oct. 4, 1938

2,131,943

UNITED STATES PATENT OFFICE 2,131,943

CONTROL DEVICE

Charles Augustus Francis Fennell, Letchworth, England, assignor to Charles Edwin Foster, Letchworth, England Application August 14, 1935, Serial No. 36,195
In Great Britain August 17, 1934

10 Claims. (Cl. 74—1)

This invention relates to control devices and has for its object to provide an improved device of this character of simple construction.

It is frequently desired to operate an alarm or signal depending upon the change of some physical quantity, the alarm or signal being designed to indicate when the physical quantity passes beyond certain limits. As an example we may consider a high temperature, the value of which is indicated by the movement of a pointer over a scale. Alternatively, the physical quantity may be measured by a null or balance method in which case the movement of the pointer will indicate only departure above or below the point of balance of the temperature. Similar arrangements may be desired in connection with other physical quantities whose value or balances can be indicated by the movement of a pointer.

Alternatively, or in conjunction with the alarm or signal there may be mechanism whereby the physical quantity is actually controlled in this manner, the control operating to bring it back to the desired figure or point of balance.

Many devices have been used to perform this kind of operation, and a large class of them, to which this invention is applicable, operate by periodic depressions of a pointer in a direction more or less parallel to the axis of the deflection and at right angles to the plane of the deflection. Between these periodic deflections the pointer is free to take its natural position under the influence of the physical quantity being measured.

These periodic depressions may be made to operate alarm or signal and/or control systems, the operation being usually that when the deflection of the pointer has fallen below the desired figure the mechanism is operated in one sense whereas, when it rises above the desired figure the next depression operates the mechanism in the opposite sense.

The present invention consists of an alarm or control device comprising intermittently operated mechanical depression mechanism adapted to operate flexible pusher or tension mechanism operatively connected to switch or relay apparatus operating the alarm or effecting the control.

The invention may consist of an electric alarm or control device comprising motor operated mechanical depression mechanism controlled by the alarm or control device and adapted to operate flexible pusher mechanism operatively connected to switch or relay apparatus.

In the preferred form of device for transforming the movement of the vertical pusher to one operating the relay or switch, a flexible wire apparatus is used comprising an outer flexible sleeve of incompressible and inextensible length provided with sleeves at each end. This outer sleeve contains a flexible member also rigid in length and provided with projecting ends, and the outer member may contain a spring arranged to return the inner member to its original position after being pushed through or pulled through the flexible sleeve. The apparatus is applicable to pushed pull, push, or twisting transmission.

Figure 2:
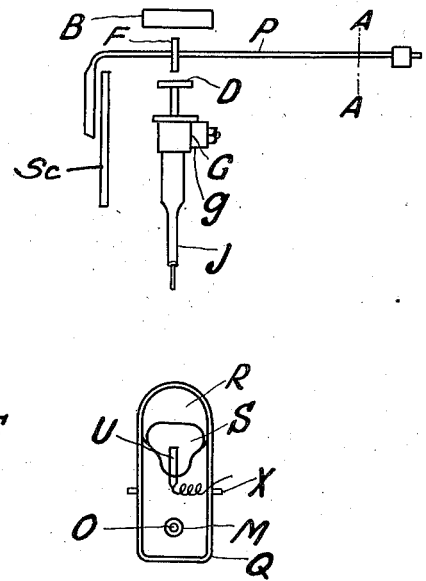
Figure 3:
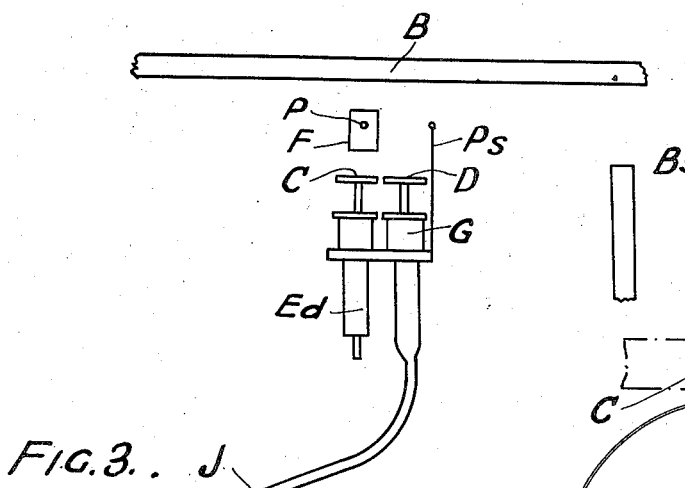
Figure 1A:
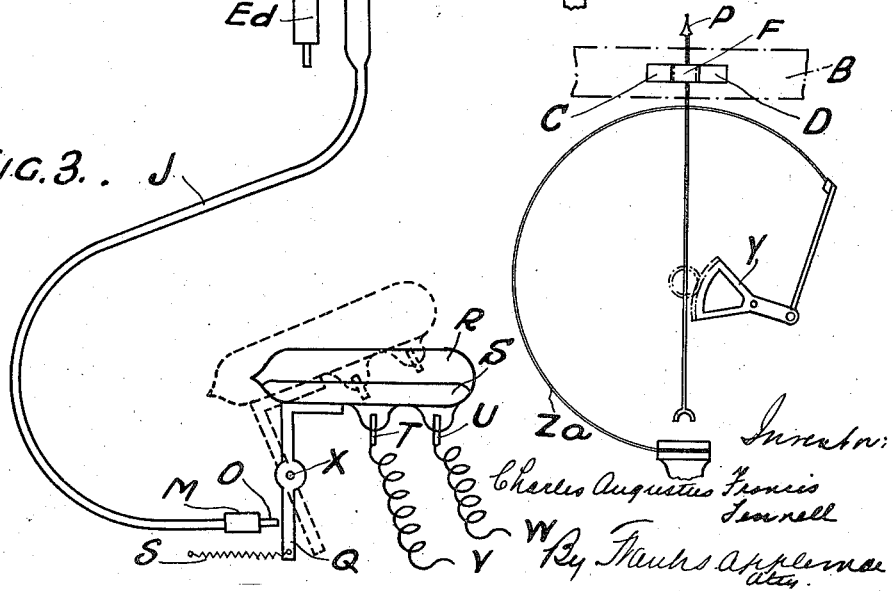
Figure 4:
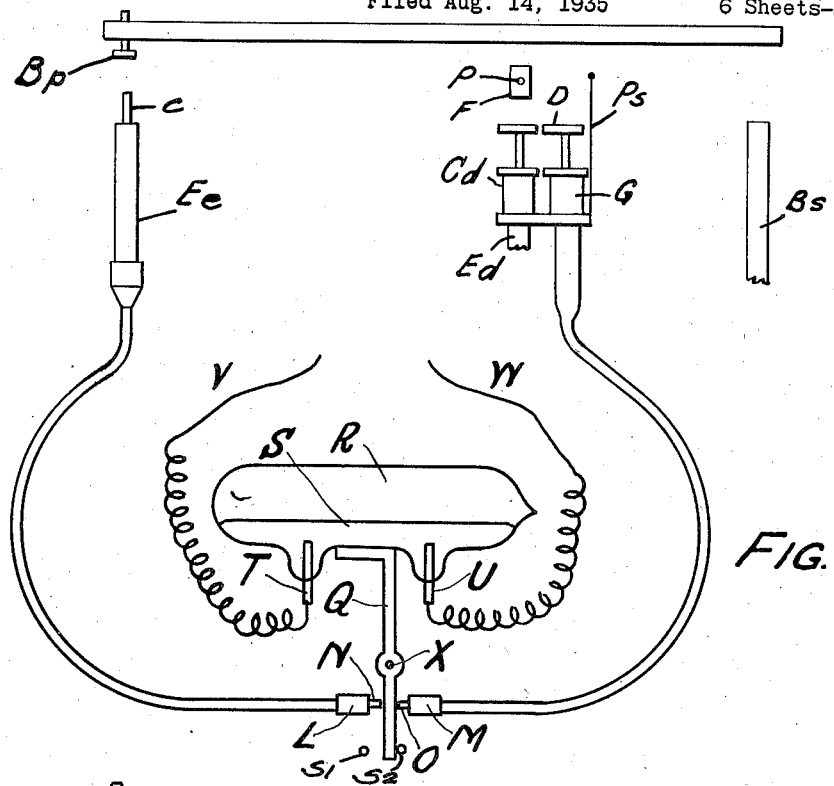
Figure 5:
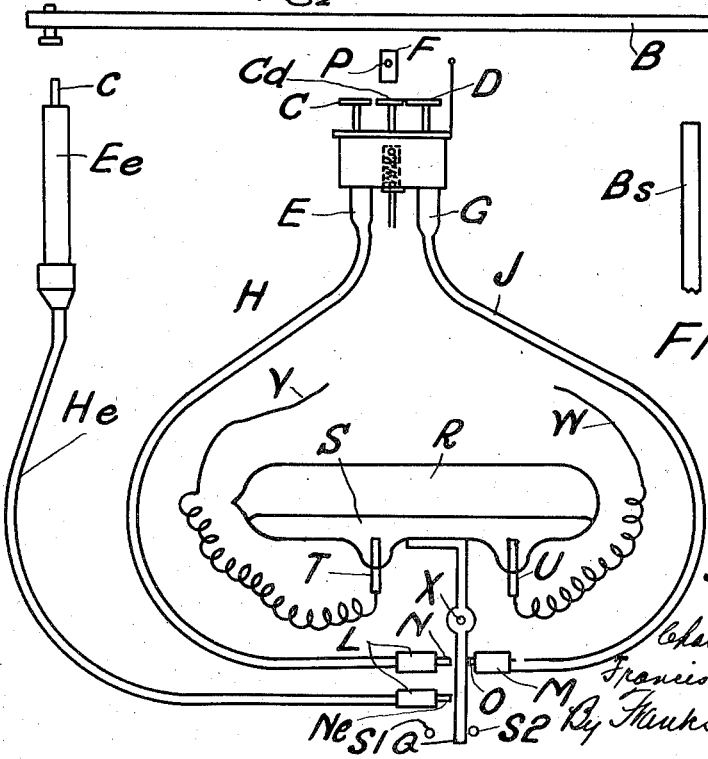
Figure 6:
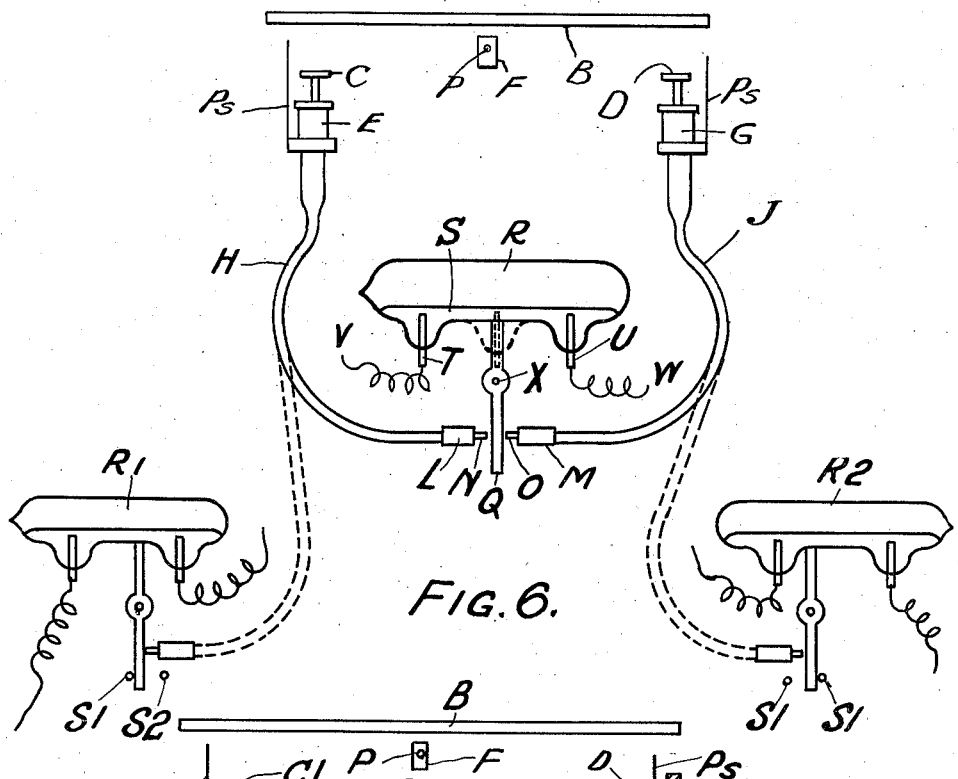
Figure 7:
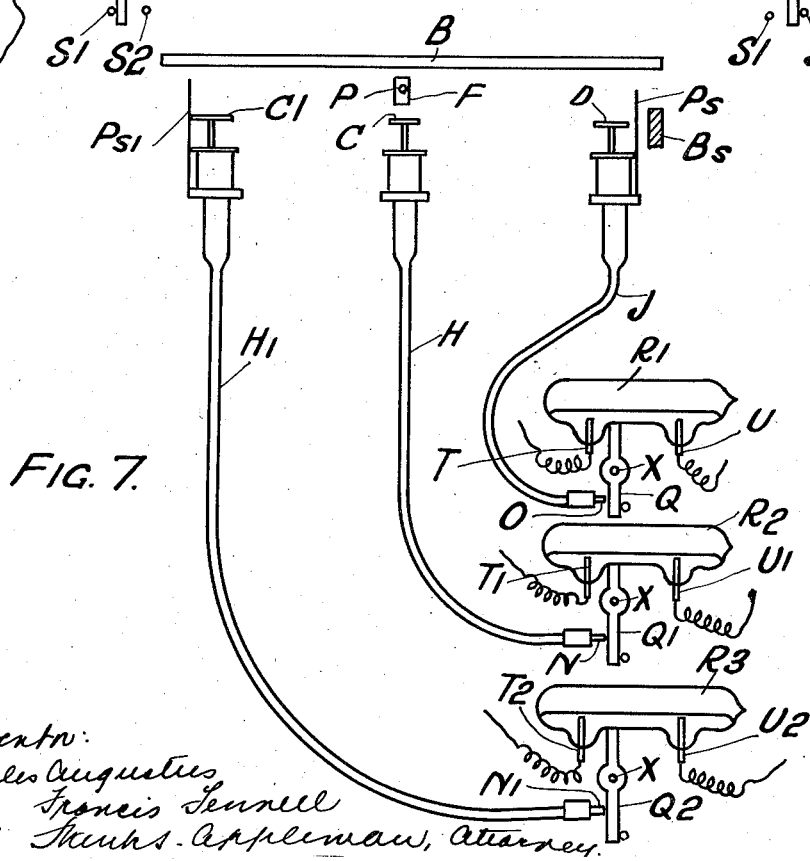
Figure 12:
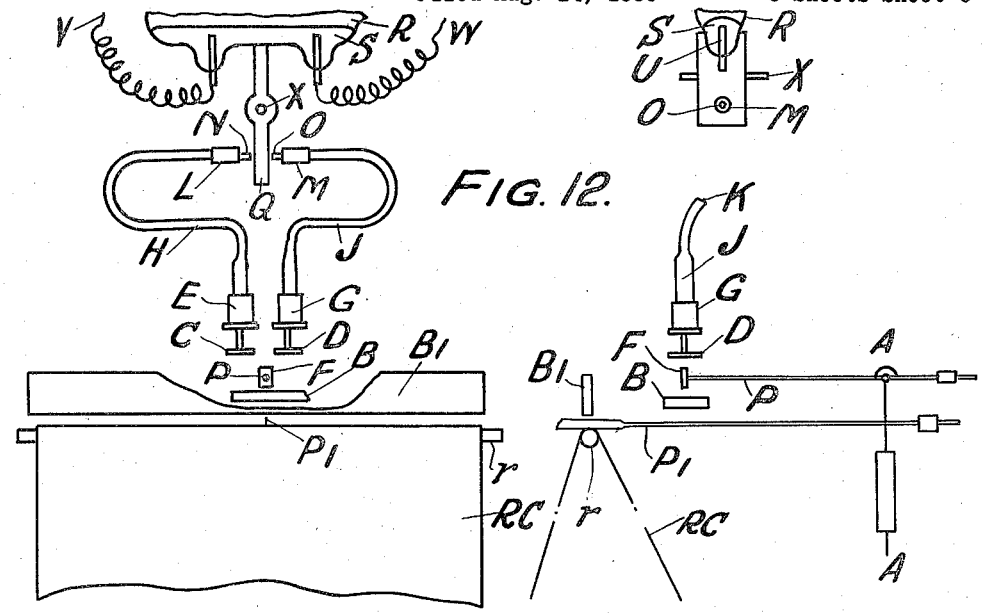
Figure 13:
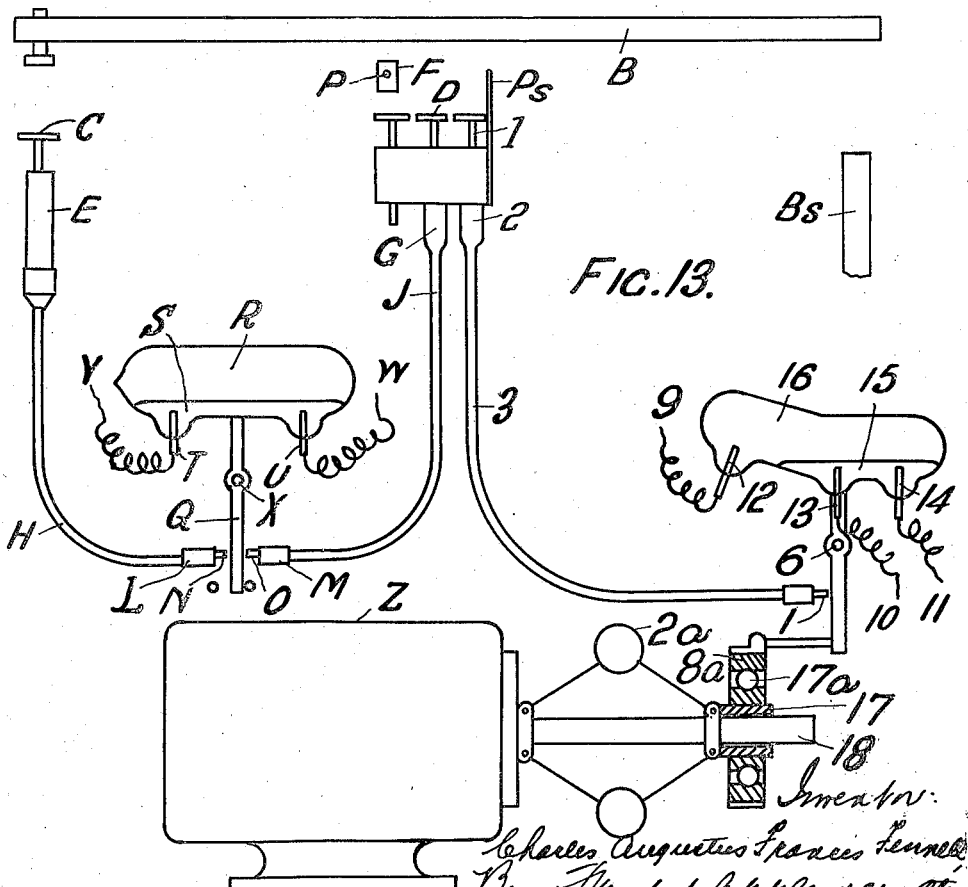

Various manners of carrying out the invention are indicated diagrammatically by the accompanying drawings in which Figure 1 is a front elevation, Figure 1a is a modification of Figure 1, Figure 2 a side elevation of a simple form of the device, Figure 3 is a modification of Figure 1, Figure 4 is a similar view of the apparatus for two way control, Figure 5 is a similar view of the apparatus using a central dead space, Figure 6 is a similar view of modification of the apparatus for maximum and minimum systems, Figure 7 is a similar view of the apparatus applied to a three way system, Figure 8 is a similar view of the apparatus applied to a modified three way control system, Figure 9 is a similar view as applied to a two way or off system, Figure 10 is a similar view of the apparatus applied to a multiple zone control distributor, Figure 11 is a detail of a pusher platform, Figure 12 is a similar view of the apparatus as applied to a recorder system, Figure 13 is a similar view of the apparatus as applied to an automatic safety switch alarm system and Figure 14 is a modification of Figure 13.

In Figure 1 the apparatus to which the invention is applied is of the kind having a thermometer or pyrometer provided with a direct deflection pointer arranged to operate apparatus controlling the temperature of an electric furnace. This apparatus is provided with a pointer P turning about a vertical axis A, A by means of a coil carrying an electric current generated by a thermo couple inserted in a furnace or by other source of electric energy. The pointer P overhangs a scale Sc indicating the temperature and carries a finger F. Situated above the pointer P and parallel to the plane in which it moves normally is a presser bar B. The horizontal presser bar B is periodically lowered vertically by any suitable mechanism to engage the horizontally movable finger F and press it downwards below the upper level of platforms C and D of flexible push mechanism. The mechanism carrying the platforms C and D can be adjusted laterally on a guide $g$ together to any desired portion of the scale Sc. The space between the platforms C and D is sufficient to enable the finger F to pass downwards between them.

The platforms C and D are fixed respectively to the heads of flexible pushers N and O which pass through flexible but incompressible and inextensible tubes H and J which can be bent to take up any desired position. In the example illustrated the free ends of the flexible pushers N and O extend through the ends of the tubes H and J so as to take up positions in line with one another on opposite sides of the lower arms of a vertically arranged lever Q pivoted at X and carry in its upper arm a mercury contact switch R containing mercury S in which are submersed contacts T, U at opposite sides of the pivot X of the lever. The contacts T and U are connected to electric leads V and W respectively and the lower ends of the flexible pushers N, O extend through fixed guides L, M to which the lower ends of the tubes H and J are attached respectively.

The upper ends of the tubes H, J are fixed respectively to fixed vertical guides E and G in which move vertically the upper ends of the flexible pushers N, O carrying the platforms C, D.

During the operation of the device when the temperature of the furnace is at the desired figure, the depression of the finger F by the presser bar B will not produce any change in temperature control apparatus as the finger F passes freely between the platforms C and D. When however, the temperature falls below the desired value, the pointer P will move the finger F over the platform C and depress the same and so force the flexible pusher N to engage the lever Q and tilt it about its pivot and cause the mercury S to cover the two contacts T, U and so send a current to the temperature controlling apparatus of the furnace. The outer ends of the leads V and W may be, for instance in a series circuit of the electric furnace, so that when the temperature of the furnace falls the current is switched on to the furnace by the above action. If desired, the circuit closer may be arranged so as to be normally open and be closed when an abnormal condition arises.

When the temperature rises above the desired figure, the subsequent depression of the finger F will force down the platform D, so that by means of the pusher O the circuit V, W will be opened. The pointer P may be operated by any other suitable thermometer and the lever Q may be substituted by any other member adapted to operate switch or relay apparatus.

In the modification shown in Figure 1a, in which the pyrometer system is substituted by a fluid pressure measuring system, the pointer P is that of a Bourdon tube pressure gauge, Za being the tube and Y the gearing connected thereto to turn the pointer P about the axis of its pinion. As in the previous example the pointer is intermittently depressed by a presser bar B, while F is the depressing finger carried by the pointer P. In a similar substitution the lever Q can be made to operate a mechanical control or relay to such control.

Figure 3 illustrates a modification of the apparatus suitable for cases in which either an intermittent alarm or signal is all that is required, or in which a brief interruption or alteration of the heat supply is sufficient to restore the temperature when it exceeds, in either direction the desired figure. The platform D is operated by the finger F of the pointer P when the temperature exceeds the desired figure, and operates to tilt the mercury switch R as to break the circuit V, W and thereby cut out the heat supply. This mercury switch R as in the previous example tilts about the pivot X and has a gravity and spring return, s being the return spring, so that when the depression of presser bar B ceases the pointer P rises and the mercury switch R returns to the "on" position.

In this arrangement the other platform C operates in a dummy guide Ed and simply receives the pointer when the temperature is low. A fixed abutment Bs is provided to limit the downward movement of the presser bar B.

In order to prevent the pointer P passing out of the range of the platform D in the high temperature direction a stop Ps is provided.

In Figure 4 a modification comprising an alarm and control, or two way device is illustrated. The space between the platform C and D as shown in Figure 1 have certain disadvantages, for instance the finger F on the pointer P may engage only the extreme edge of say the platform D and it may slip off giving the pointer an undesirable twisting stress and cause a side way flick. To overcome this difficulty the platform Cd may be supported by a spring loaded dummy Ed, the spring therein being so light that the presser bar B and pointer P are able to depress both the platform C and D when the finger F engages both of them so that no slip off sideways will take place.

In order to switch on the heating current after it has been cut out by the apparatus, an additional presser Bp is provided at the zero end of the presser bar B and adapted to engage a flexible pusher c having a lower end N operating as in the previous examples, and is guided at its upper end in a guide Ee.

When the stylus F is away from platforms Cd and D, presser bar B and Bp fall and compress C to limit of the stop S2, see Fig. 4. Stop S1 is so adjusted that the movement of D when fully depressed by stylus F is such that presser bar B can not move down a sufficient extent to allow Bp to depress c. The movement of Cd is such that should stylus F depress Cd only, presser bar B will fall to such level as to allow Bp to depress C to limit of stop S2. Contacts T and U are thus made for all positions of stylus F when it is clear of platform D. Contacts T and U are broken when stylus F is over platform D or platforms D and Cd simultaneously.

The modification illustrated by Figure 5 is a two way device having a dead space and a zero device as in Figure 4. In automatic control of certain types it is desirable to have a certain narrow temperature range within which the pointer may move without causing any modification of the then existing condition of heating or cooling. This is achieved by a dead space covered by a spring return dummy platform Cd arranged between the platform C and D. This has also the advantage of avoiding the slip off flick of the pointer P and may be combined with an extra low or zero contact c as in Figure 4. The switch lever Q' is provided with limiting stops s1 and s2, the parts corresponding to the previous figures are given the same references.

Figure 6 illustrates a modification having high and low contact platforms. The arrangement illustrated by Figures 1 to 5 are for narrow ranges of heat control, and in certain cases signals are only required to operate when the temperature passes beyond much wider limits, that is to say when the temperature is abnormally high or low, and such signals may be associated with automatic control, the high contact platform may be arranged to cut off the heat from the furnace completely until someone attends to the abnormal conditions. In this arrangement stops Ps are provided beyond each contact platform D and C to arrest the finger F to prevent movement beyond either contact platform. Also there may be one mercury switch R making alternative circuits in opposite directions, or there may be two separate spring return mercury switches R1 and R2, one of each circuit.

In Figure 7 is illustrated a three way independently adjusted modification as developed from Figure 6, having three separate contact platforms D, C and C1 operating flexible push rods O, N or N1 engaging switch levers Q, Q1 and Q2 respectively.

This modification may be used in conjunction with three-colour lamp signals. In the case of automatic control with or without signalling the three platforms D, C and C1 may be brought close together, the lower contact platform C1 may put on full heat, the middle platform C may be made to reduce the heat in any desired proportion and the high contact platform D arranged to cut off the heat.

In Figure 8 is illustrated a three way modification comprising high and low contact platforms D, C, C1 with an additional zero low contact c. This modification may be used for control in conjunction with three-color lamp signals and has the zero low to secure the first switch on.

The modification illustrated in Figure 9 is a two-way spring loaded platform of which the depression force is limited. A vertical dead space is provided in this arrangement by making the finger F wider than the space between the platforms C and D and springs A1 and A2 supporting these platforms are made of such a strength that together they are sufficient to resist the downward force of the presser bar B. Thus when the finger F is in the position illustrated and the presser bar B is operated no movement is transmitted to the lever Q of the mercury switch R.

Figure 10 illustrates a modification of the multiple zone selector type. In cases where a very large furnace has its temperature controlled independently in different zones by pyrometers, a pointer P is arranged to be switched over from the pyrometer of one zone to that of another, and during this change over the connections from the main mercury switch R1 or switches operated by the flexible pusher N or O are also changed to connect appropriate valves, switches or other heat controlling devices of the zone to the terminals V and W. After a depression of the platform D has been made for any particular zone the device is then switched on to the pyrometer in the next zone and so on. This is effected by separate sets R1 to R4 of mercury switches which are operated by cam mechanism K1 to K4 from a shaft Mh driven by bevel gear Mw from a motor spindle Mo of the motor driving by the cam Mm the presser bar lifting spindle Mp.

Figure 11 is a modification of the platform D and comprises an alternative to the spring loaded dummy described above to prevent slip off of the finger F from the platform D. The finger F is provided with an inclined deflector or pointer F1 and the platform D with an oppositely disposed deflector D2 so that if the deflector F1 engages D at all it will be guided by the deflector D2 over the platform D and so cannot slip off.

Figure 12 illustrates a modification applied to apparatus having recording devices. In this modification a recording chart RC is fed over a small roller r. Above the chart RC and only touching it at times is a knife-edge pointer P1 and above the pointer P1 is the presser bar B1.

In this modification the apparatus is designed for use with inverted platforms. Between the pointer P1 and the chart RC is arranged a typewriter ribbon, so that when the presser bar B1 falls it depresses the ribbon to form a dot on the chart in a position corresponding to the deflection of the pointer P. Carried upon the same axis as the pointer P1 is a second pointer P with its finger F arranged to be pressed on the platform D by the upward movement of the presser bar B.

Figure 13 comprises an example of the two way type with automatic safety switch alarm. This modification is designed to provide a safeguard if, for any reason, the normal high contact D fails to cut off the supply of heat. In such a case the pointer P will travel along the scale until it is over the platform of the push rod 1 operating in the mounting 2 and tube 3 the mercury switch 16. The succeeding depression of the presser bar B will operate platform 1 and the mercury switch 16 having contacts 12, 13 and 14. In the case of an electric furnace, the circuit 10 and 11 would be in series with the circuit Y, W leading to the contactor of the main switch. Normally it would be in the position shown with the circuit closed.

In such an emergency the switch 16 would be tilted so that the circuit between the leads 10 and 11 would be broken, and the main switch cut out. A positive stop Ps is provided to the right of the contact platform of M1 push rod to prevent the pointer P from passing beyond the range of that contact in the high temperature direction.

The depression mechanism of these automatic control devices are almost invariably operated by a small electric motor having reducing gearing and cam mechanism and if the motor should for any reason stop then the depression mechanism will cease to operate. When the motor stops due to failure of the whole electric supply, then of course the contactors will be de-energized and the supply of heat cut off, but if the motor should stop through faults of its own while the electric supply is still on, the furnace might still run up to a dangerous temperature and the mechanism would have no means of stopping it.

Provision is made against such a contingency by providing on a motor Z a governor 2a arranged on the shaft 18 of the motor and adapted to operate a sleeve 17 sliding on the shaft 18 and carrying on the outer race 8a of a ball bearing 17a, a link 8 adapted to operate the lever 7 of the mercury switch 16 pivoted at 6.

When the motor Z is stationary the weights of the governor 2a are arranged to be close to the shaft 18 so that the mercury switch 16 will be tilted to open the heating circuit 10, 11 and to close the circuit 9, 10 to an alarm. Thus when the operator switches on the electric current, the alarm will sound momentarily as the motor speeds up and then will become silent and so indicate that the alarm mechanism is operating correctly. Subsequently with the increase in the speed of the motor the circuit 9, 10 will be opened and the circuit 10, 11 closed to the main contactor and the furnace will heat up. The switch 16 is held against 8a by gravity, 8a not being positively connected to 16, but the switch 16 is so mounted as to have a gravity bias against 1 or 8a.

Whilst the preferred form of safety device is the mechanical system described above and illustrated in Figure 13, the same may be achieved by a modification of the electrical circuit in which the motor, which operates the push system is situated, as in Figure 14, in which F1 and F2 are fuses, L1, L2 and L3 are electric leads to a motor Mo operating flexible detent mechanism, Ge is an electromagnetic relay coil in series with the motor Mo and holding the switch Rs in "on" position as long as the motor circuit is normal. A1 is a relay armature operated by electromagnet Ge and of which the travel is limited by stops s1, s2. The armature A1 carries the mercury switch Rs which is wired in series with a switch operated by a push system or otherwise included in a control circuit so as to cut out the circuit on failure of the motor Mo. L4 and L5 are the electric leads from the switch Rs to switches operated by the push system.

On such modification is the insertion in the motor circuit of fuses and a relay, this being excited while the motor circuit is normal, and holding in the "on" position a switch wired in series with the switch automatically operated by the push system, or otherwise connected in the control circuit so as to limit or cut off entirely the supply to the controlled object, on the circuit containing the motor becoming incomplete due to (a) an open circuit occurring in the motor winding, or (b) a short circuit occurring in the motor winding causing the sealed fuses to blow.

What I claim and desire to secure by Letters Patent is:

1. Mechanism for transmitting motion comprising an axially movable flexible member along which the motion is transmitted, a flexible casing having fixed ends and containing the axially movable member, a vertically movable platform adapted to have its motion transmitted to the end of the flexible member, a horizontally moving finger movable transversely of the platform, a vertically reciprocated continuously moving horizontal rod engaging the horizontally movable finger, transmitting motion from the platform to the axially movable flexible member.

2. A mechanism for transmitting motion in accordance with a variable, comprising a member movable along a given path in accordance with said variable, a flexible transmission device having one end in the neighborhood of said path, said device comprising an elongated longitudinally movable flexible transmission element for transmitting the motion, and an elongated flexible casing therefor having fixed ends, means for intermittently moving said member transversely of said path, and means whereby said member, when so moved, is adapted, when its position along said path corresponds with that of the aforesaid end of said transmission device, to make operative engagement with the said end.

3. A mechanism for transmitting motion in accordance with a variable, comprising a member movable along a given path in accordance with said variable, a flexible transmission device for transmitting the motion, said device having one end in the neighborhood of said path, means for intermittently moving said member transversely of said path, and means whereby said member, when so moved, is adapted, when its position along said path corresponds with that of the aforesaid end of said transmission device, to make operative engagement with the said end, the position of the said end being adjustable in a sense longitudinally of said path by virtue of the flexibility of said transmission device, whereby the position of said member at which said device is operated may be predetermined.

4. A mechanism for transmitting motion to a controlled element in accordance with a variable, comprising a member movable along a given path in accordance with said variable, two flexible transmission devices for transmitting motion to said controlled element in reverse directions respectively said devices having their ends remote from the controlled element in the neighborhood of said path, means for intermittently moving said member transversely of said path, and means whereby, said member, when so moved, is adapted, when its position along said path corresponds with that of either of the aforesaid ends of the respective transmission devices, to make operative engagement with such end, the positions of the said ends being adjustable in a sense longitudinally of said path by virtue of the flexibility of said transmission devices, whereby the positions of said member at which said controlled element is respectively operated in reverse directions may be predetermined.

5. A mechanism for transmitting motion in accordance with a variable, comprising a member movable along a given path in accordance with said variable, a flexible transmission device having one end in the neighborhood of said path, said device comprising an elongated longitudinally movable flexible transmission element for transmitting the motion, and an elongated flexible casing therefor having fixed ends, means for intermittently moving said member transversely of said path, and means whereby said member, when so moved, is adapted, when its position along said path corresponds with that of the aforesaid end of said transmission device, to make operative engagement with the said end, the fixed position of the casing at the said end being adjustable in a sense longitudinally of said path by virtue of the flexibility of said transmission device, whereby the position of said member at which said device is operated may be predetermined.

6. A mechanism for transmitting motion in accordance with a variable, comprising a member movable along a given path in accordance with said variable, a flexible transmission device for transmitting the motion, said device having one end in the neighborhood of said path, means for intermittently moving said member transversely of said path, means whereby said member, when so moved is adapted, when its position along said path corresponds with that of the aforesaid end of said transmission device, to abut against the said end and thereby operate said device, a supporting element having a yielding movement parallel to that of the said end of the transmitting device, located adjacent the said end for supporting said member when it is only just abutting against the said end and preventing violent disengagement of said member from the said end.

7. A mechanism for transmitting motion to a controlled element in accordance with a variable, comprising a member movable along a given path in accordance with said variable, two transmission devices for transmitting motion to said controlled element in reverse directions respectively, one of said devices having its end remote from the controlled element in the neighborhood of said path, an elongated operating element having a surface substantially parallel to said path and adapted, intermittently, to move in a direction transversely of said path, and thereby intermittently move said member transversely of said path, means whereby said member, when so moved, is adapted, when its position along said path corresponds with that of the said end of said transmission device, to make engagement with said end thereby operating said transmission device and checking the stroke of said operating element, and means whereby, when the stroke of said operating element is not checked, said operating element makes engagement with the end of the other transmission device remote from the controlled element and thereby operates said other transmission device.

8. A mechanism for transmitting motion to a controlled element in accordance with a variable, comprising a member movable along a given path in accordance with said variable, two transmission devices for transmitting motion to said controlled element in reverse directions respectively, one of said devices having its end remote from the controlled element in the neighborhood of said path, a supporting element also located in the neighborhood of said path, an elongated operating element having a surface substantially parallel to said path and adapted, intermittently, to move in a direction transversely of said path, and thereby intermittently move said member transversely of said path, means whereby said member, when so moved, is adapted, when its position along said path corresponds with that of the said end of said transmission device, to make engagement with said end thereby operating said transmission device and checking the stroke of said operating element and when its position along said path corresponds with that of said supporting element to make engagement with said supporting element thereby also checking the stroke of said operating element, and means whereby, when the stroke of said operating element is not checked, said operating element makes engagement with the end of the other transmission device remote from the controlled element and thereby operates said other transmission device.

9. A mechanism for transmitting motion in accordance with a variable, comprising a member movable along a given path in accordance with said variable, a transmission device for transmitting the motion, said device having one end in the neighborhood of said path, means for intermittently moving said member transversely of said path, means whereby said member, when so moved, is adapted when its position along said path corresponds with that of the aforesaid end of said transmission device, to abut against the said end and thereby operates said device, said member and said end of said transmission device being provided respectively with knife edge extensions adapted to engage one another when the position of said moving member only just corresponds with that of the said end for deflecting said member into full abutting engagement with the said end.

10. Apparatus for controlling a plurality of variables, comprising a member movable along a given path, a controlling element, a transmission device for transmitting motion to said controlling element, said device having one end in the neighborhood of said path, means for intermittently moving said member transversely of said path, means whereby said member, when so moved, is adapted, when its position along said path corresponds with that of the aforesaid end of said transmission device, to make operative engagement with the said end thereby causing said device to transmit motion to said controlling element, means whereby the position of said member along said path is caused to vary in accordance with each of the aforesaid variables in succession, and means whereby said controlling element is caused to control each of said variables in succession.

CHARLES AUGUSTUS FRANCIS FENNELL.